United States Patent [19]
Holland et al.

[11] Patent Number: 5,202,783
[45] Date of Patent: Apr. 13, 1993

[54] SECURE AND PROGRAMMABLE FRIENDLY TARGET RECOGNITION SYSTEM

[75] Inventors: O. Thomas Holland, Fredericksburg; Henry C. Seavey, King George, both of Va.

[73] Assignee: The United States of America as represented by the Secretary of the Navy, Washington, D.C.

[21] Appl. No.: 719,457

[22] Filed: Jun. 24, 1991

[51] Int. Cl.$^5$ .......................... H04B 10/00; G01S 1/00
[52] U.S. Cl. ..................................... 359/152; 359/143; 359/154; 342/45; 342/53
[58] Field of Search ................ 359/154, 155, 159, 152, 359/143, 142, 168, 170; 342/45, 50, 53, 67; 250/302-206; 340/825.34, 825.49, 825.54

[56] References Cited

U.S. PATENT DOCUMENTS

| | | | |
|---|---|---|---|
| 4,049,969 | 9/1977 | Salonimer et al. | 250/458.1 |
| 4,081,669 | 3/1978 | Klingman, III | 359/155 |
| 4,091,734 | 5/1978 | Redmond et al. | 359/158 |
| 4,207,459 | 6/1980 | Nakamura et al. | 359/161 |
| 4,361,911 | 11/1982 | Buser et al. | 359/169 |
| 4,725,841 | 2/1988 | Nysen et al. | 342/44 |
| 4,763,361 | 8/1988 | Honeycutt et al. | 359/156 |
| 4,837,575 | 6/1989 | Conner, Jr. | 342/45 |
| 4,862,176 | 8/1989 | Voles | 342/45 |
| 4,887,310 | 12/1989 | Mayzonnette et al. | 359/170 |
| 5,001,488 | 3/1991 | Joguet | 359/143 |

*Primary Examiner*—Edward L. Coles, Sr.
*Assistant Examiner*—Kinfe-Michael Negash
*Attorney, Agent, or Firm*—John D. Lewis; Jacob Shuster

[57] ABSTRACT

A friendly target recognition system is provided for use in combat zones having friendly and unfriendly target objects residing therein. Transmitting means are mounted on each friendly target object in the combat zone to transmit radiation in the form of coded, short burst data packets according to a particular digital transmission code sequence. A receiving means is mounted on the targeting device that is aimed at one targeted object. The receiving means has a field-of-view that is limited to the one targeted object such that the presence of the transmitted radiation according to the particular digital transmission code sequence is indicative of a friendly target object.

14 Claims, 2 Drawing Sheets

SECURE AND PROGRAMMABLE FRIENDLY TARGET RECOGNITION SYSTEM

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to "Identify—Friend or Foe" systems and more particularly to a system for recognizing a targeted object as friendly that is based on secure and programmable codes.

BACKGROUND OF THE INVENTION

Perhaps the most tragic war casualties are those resulting from friendly fire. Accordingly, various systems have been devised over the years to minimize the number of such incidents. For instance, aircraft have used particular flight approaches, patterns and visual beacons. Ground equipment have identified themselves as friendly through the use of identifying paints, tapes or other visual markings. However, the problem with all of these prior art approaches is that the enemy forces can easily see and duplicate them thereby rendering them useless.

Naturally, as technology improved, so did the "Identify—Friend or Foe" (IFF) systems. In particular, interrogation systems have been developed that require the targeting device to first send out an interrogation signal to a targeted object. If the targeted object is friendly, it is equipped with means to reflect the interrogation signal back to the targeting device in such a way that the targeted object is identified as friendly. Representative examples of such interrogation-reflection systems are disclosed in U.S. Pat. No. 4,049,969 issued to Salonimer et al, U.S. Pat. No. 4,361,911 issued to Buser et al and U.S. Pat. No. 4,763,361 issued to Honeycutt et al. These systems require the targeted object to first receive from, and then reflect/transmit back to, the targeting device in order to be identified as friendly. However, in chaotic battlefield conditions, it is desirable to minimize the amount of required communication between friendly objects/vehicles. In addition, these systems are not secure from enemy use if confiscated. Thus, the confiscated devices can easily be used to camouflage an enemy target as "friendly".

SUMMARY OF THE INVENTION

Accordingly, it is an object of the present invention to provide a friendly target recognition system that minimizes the amount of required communication between a targeting device and a friendly target.

It is a further object of the present invention to provide a friendly target recognition system that is not subject to enemy duplication.

Yet another object of the present invention is to provide a friendly target recognition system that may be easily modified to prevent enemy use of the system should any of the systems be confiscated by the enemy.

Still another object of the present invention is to provide a friendly target recognition system that is adaptable to both aircraft and land based equipment.

Other objects and advantages of the present invention will become more obvious hereinafter in the specification and drawings.

In accordance with the present invention, a friendly target recognition system is provided for use in a combat zone having friendly and unfriendly target objects residing therein. The system may be utilized by a targeting device to recognize a friendly target object during the targeting thereof. In particular, transmitting means are mounted on each friendly target object in the combat zone. Each transmitting means transmits radiation in the form of coded, short burst data packets according to a particular digital transmission code sequence. A receiving means is mounted on the targeting device and aimed at one targeted object. The receiving means has a field-of-view that is limited to the one targeted object such that the presence of the transmitted radiation according to the particular digital transmission code sequence is indicative of a friendly target object.

DETAILED DESCRIPTION OF THE INVENTION

Figure 1A:
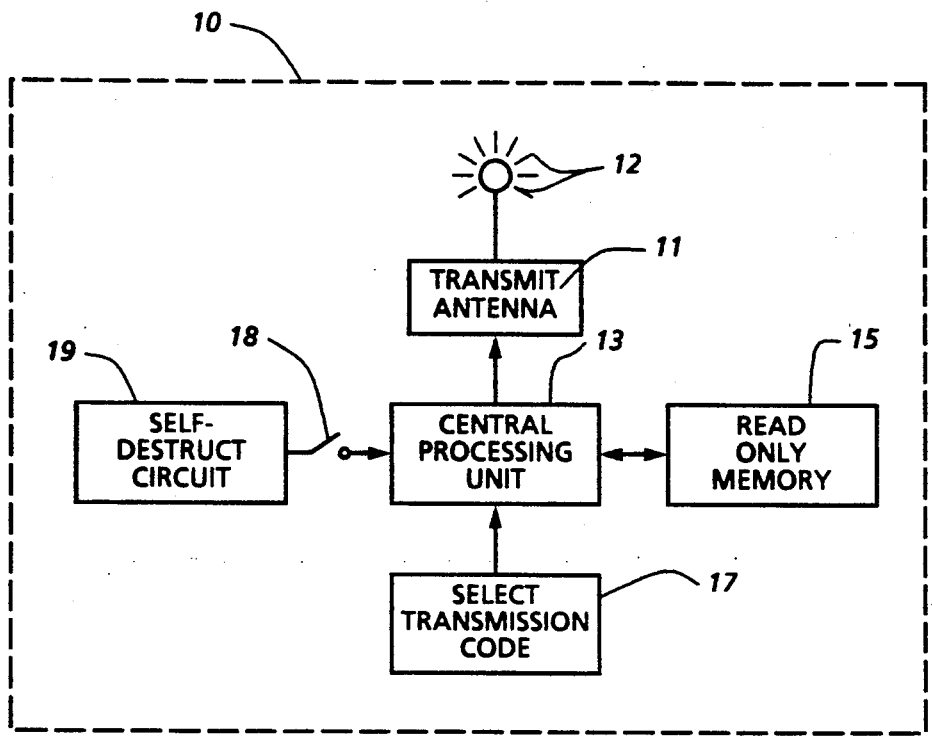
FIG. 1 is a functional block diagram of the friendly target recognition system according to the present invention.
Figure 1B:
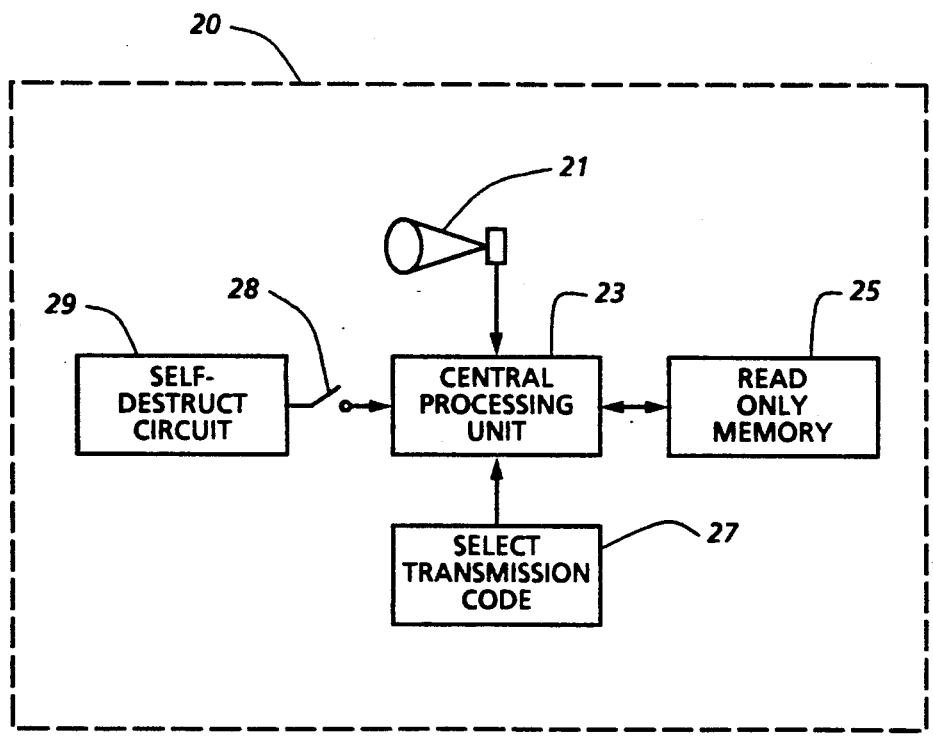

Referring now to the drawings, and in particular to FIG. 1, a block diagram is shown that embodies the functional elements of the present invention. It is to be understood at the outset that there are many physical system variations that may be made without departing from the teachings herein. Some of these variations will be indicated more specifically throughout the disclosure.

In particular, a transmitting unit 10 and receiving unit 20 comprise the basic elements of the friendly object recognition system according to the present invention. The transmitting unit's antenna 11 transmits radiation 12 that is indicative of a friendly object. Radiation 12 is typically in the form of infrared, laser or microwave radiation. However, for purposes of description only, the remainder of the disclosure will assume infrared radiation is being transmitted.

In order to provide a system that is difficult for the enemy to detect and decode as a radiating IFF system, the present invention transmits the radiation in coded, short burst data packets. The short burst data packets consist of mathematically encoded information that specifies the particular radiating unit as "friendly". The actual form of the packet may be any that is common to digital communications and may also take advantage of conventional data compression techniques. The goal is to minimize the "on air" or transmission time. To accomplish this, a central processing unit (CPU) provides a particular digital transmission code sequence to antenna 11. Antenna 11 uses this digital transmission code sequence to generate the aforementioned short burst data packets.

CPU 13 may be any conventional single chip microcomputer, the choice of which is dictated by the complexity and requirements of the system. An appropriate class of CPU's would be those termed microcontrollers. Microcontrollers typically include most, if not all, of the required CPU subsystems (e.g., program memory, random access memory, analog-to-digital converters, event counters, timers and input-output interfaces). Thus, the design of the device using the microcontroller is simplified since a minimum of separate components are required. A representative group of such microcontrollers is the Intel 8051 family of microcomputers.

A read only memory (ROM) 15 may also be provided in communication with the CPU 13 for storing a library of the digital transmission codes. In such cases, means 17 for selecting the particular digital transmission code are generally provided as well. Selecting means 17 is typically a conventional electronic keypad that accesses the ROM 15 via CPU 13 to select the particular digital transmission code. Selecting means 17 might also be an antenna (not shown) that receives a remotely generated instruction to select the particular digital transmission code.

Utilizing conventionally available single chip CPU's and ROM's, transmitting unit 10 is capable of transmitting radiation based upon a large library of friendly transmission codes. Thus, transmitting unit 10 may be easily reprogrammed with a new particular digital transmission code as desired (i.e., daily, weekly, etc.). Furthermore, should a transmitting unit 10 fall unto enemy hands, the ROM 15 could be replaced with a new library of digital transmission codes. Accordingly, the system is never rendered useless even if confiscated.

As an added measure of security, a self-destruct circuit 19 may be provided. A conventional self-destruct circuit 19 would be connected via switch 18 to CPU 13 if either an unauthorized movement of transmitting unit 10 or unauthorized access to the library of digital transmission codes stored in ROM 15 were detected. Self-destruct circuit 19 is typically designed to destroy all components within CPU 13 and ROM 15 by increasing the voltage supplied to CPU 13 when switch 18 is closed. The selection of a specific self-destruct circuit 19 is a design choice and in no way limits the present invention. Conventional features such as timers and means for deactivating the self-destruct circuit may be used as desired.

Figure 2A:
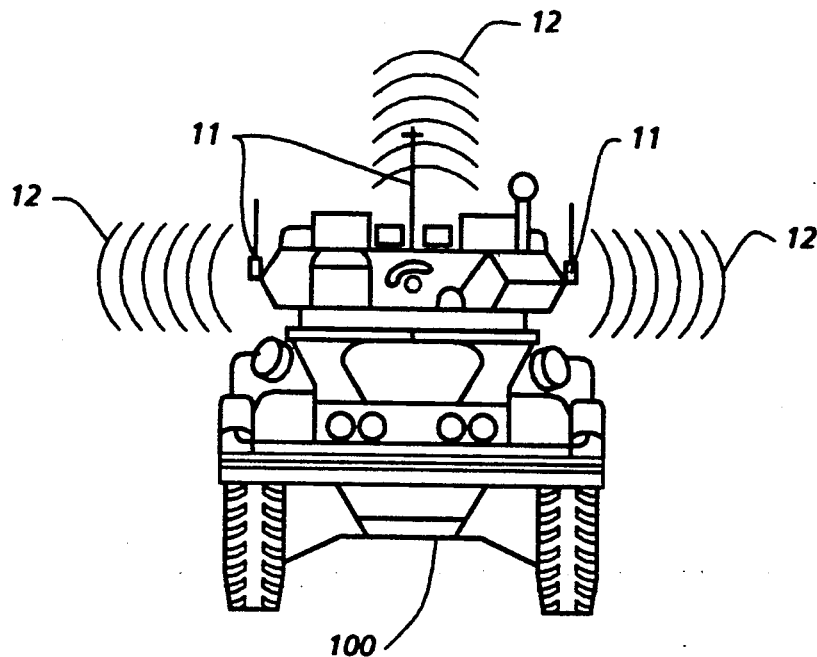
FIG. 2 depicts two friendly combat vehicles equipped with the system of the present invention.
Figure 2B:
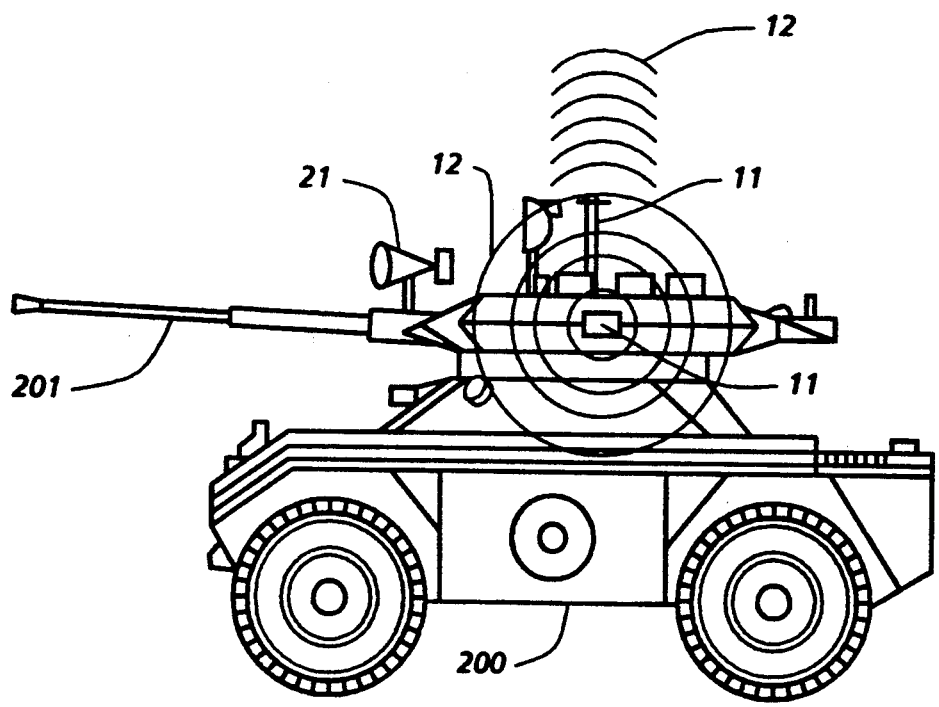

In order to better understand the present invention, simultaneous reference will be made to FIG. 2 where two friendly combat vehicles 100 and 200 are shown using the system of the present invention. Like reference numerals will be used for common elements. In particular, vehicle 200 is equipped with a weapon 201 aimed at friendly vehicle 100, hereinafter referred to as targeted vehicle 100. (Note that targeted vehicle 100 may or may not be equipped with weapons capability.) The main objective of the present invention is the recognition of targeted vehicle 100 as a friendly object. Accordingly, targeted vehicle 100 is equipped with one or more transmitting antennas 11 in order to transmit radiation 12 in all directions about targeted vehicle 100. The transmitted radiation is the form of the afore-mentioned short burst data packets indicative of the particular digital transmission code.

The second basic element of the present invention is a receiving unit 20 that includes a limited field-of-view, directional receiver 21. The field-of-view of receiver 21 is governed by the receiver's antenna or lens configuration as is well-known in the art. The field-of-view of receiver 21 is limited to targeted vehicle 100 such that, during the targeting process, receiver 21 can detect transmitted radiation 12 only from targeted object 100. A CPU 23, ROM 25 and selecting means 27 provide functions analogous to the CPU 13, ROM 15 and selecting means 17, respectively. Specifically, CPU 23 is provided with a friendly objects code that matches the particular digital transmission code. Thus, ROM 25 is identical to ROM 15 in that the same library of codes are provided to both the receiving unit 20 and the transmitting unit 10. Selecting means 27 is used to choose the friendly objects code from ROM 25. Finally, CPU 23 compares the decoded transmission code with the friendly objects code whereby a match indicates that targeted vehicle 100 is friendly. If a match occurs, an indicator (not shown) may be provided to indicate "FRIEND". Alternatively, a match may be used to inhibit the weapon's firing capability. If no match occurs, a second indicator (not shown) may be provided to indicate "FOE". Of course, it is to be understood that recognition of a friendly target is paramount to the present invention. Note also that a self-destruct circuit 29 and switch 28 may be provided and will function in an analogous manner to circuit 19 and switch 18.

The advantages achieved by such a system are numerous. The system relies on difficult to detect, short burst data packets to indicate a friendly object. Accordingly, no continuous output from a friendly vehicle is required. Furthermore, no return or reflected signals are required to indicate a vehicle's "friendliness". Thus, battlefield communication that may be used by the enemy for detection and location is kept to a minimum. Furthermore, the variety of codes available, as well as the system's ability to be reprogrammed (both on an operator selected basis and on a wholesale ROM replacement basis), serve as a means of preventing enemy duplication or effective use thereof. In addition, by providing means for self-destruction in response to unauthorized use, the system is fully protected in the event of enemy tampering. Finally, the friendly target recognition system of the present invention is easily adaptrd to many existing sensor and targeting systems.

As mentioned above, many variations of the described system are possible without deviating from the teachings thereof. For example, vehicle 200 may also be equipped with transmitting antennas 11 for transmitting radiation 12 indicative of the particular digital transmission code. In this way, vehicle 200 is prevented from being inadvertently targeted and fired upon. It is thus possible in such a case to combine CPU's 13 and 23, ROM's 15 and 25, selecting means 17 and 27 and self-destruct circuits 19 and 29 into single operational units shared by both transmitting antenna 11 and receiver 21.

The system of the present invention could further be modified to operate in an inquiry mode whereby the transmitting antenna 11 will only transmit upon receiving specific inquiries from the targeting weapon. Thus, the receiving circuit 21 would include an interrogator (not shown) to send out an interrogation signal to the targeted vehicle 100. Such an interrogation signal may simply be a signal that turns on transmitting unit 10. This could further reduce the amount of battlefield communication in that the interrogation signal would only be sent out during the targeting process.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. In a combat zone having friendly and unfriendly target objects residing therein, a system for recognizing friendly target objects during the targeting thereof, said system comprising:
    transmitting means mounted on each friendly target object in the combat zone for transmitting radiation simultaneously in all directions therefrom in the form of coded, short burst data packets according to a particular digital transmission code sequence; and
    receiving means having a field-of-view limited to one targeted object to be recognized, said receiving means being mounted on a targeting device aimed at the one targeted object for detecting said transmitted radiation in said receiving means' limited field-of-view, wherein the presence of said transmitted radiation according to the particular digital transmission code sequence is indicative of a friendly target object.

2. A system as in claim 1 further comprising:
    storage means in communication with said transmitting means for electronically storing a plurality of the digital transmission code sequences; and
    means for selecting the particular digital transmission code sequence from said stored plurality.

3. A system as in claim 2 wherein said selecting means is an electronic keypad in communication with said storage means.

4. A system as in claim 2, wherein said storage means is a read only memory (ROM).

5. A system as in claim 2 further including means for preventing unauthorized movement of said transmitting and receiving means and unauthorized access to said stored plurality of digital transmission code sequences.

6. A system as in claim 5 wherein said preventing means comprises a self-destruct circuit connected to said storage means, said circuit being activated in response to one of said unauthorized movements or unauthorized accesses.

7. A system as in claim 1 wherein said transmitted radiation is in the infrared spectrum.

8. In a combat zone having friendly and unfriendly objects residing therein, a system comprising:
    at least one transmitter, mounted on each friendly object, for radiating an infrared signal simultaneously in all directions therefrom in the form of code, short burst data packets, wherein the infrared signal is indicative of a particular digital transmission code;
    an infrared receiver, mounted on each friendly object, configured to selectively target one of the objects in the combat zone and detect the presence of the infrared signal; and
    processing means, connected to said receiver and provided with a code indicative of friendly objects, for decoding the detected infrared signal into the particular digital transmission code and for comparing the particular digital transmission code to the provided friendly objects code wherein a match therebetween indicates that the selectively targeted object is friendly.

9. A system as in claim 8 further comprising:
    means for storing a plurality of codes used for both the particular digital transmission code and the provided friendly objects code; and
    means for selecting the particular digital transmission code and the provided friendly objects code from the stored plurality.

10. A system as in claim 9 further comprising means for preventing unauthorized movement of said at least one transmitter or said receiver and for preventing unauthorized access to the stored plurality.

11. A system as in claim 10 wherein said preventing means comprises a self-destruct circuit connected to said storing means, said circuit being activated in response to one of said unauthorized movements or unauthorized accesses.

12. A system as in claim 9 wherein said storing means is a read only memory (ROM).

13. A system as in claim 9 wherein said selecting means is an input receiving means, connecting said storing means to said at least one transmitter and said receiver, for receiving inputs indicative of the particular digital transmission code and the friendly objects code.

14. A system as in claim 8 further comprising:
    first modifying means for modifying the particular digital transmission code; and
    second modifying means for modifying the friendly objects code.

* * * * *